United States Patent
Kaneko et al.

(10) Patent No.: US 7,194,322 B2
(45) Date of Patent: Mar. 20, 2007

(54) AUDIO INFORMATION REPRODUCING APPARATUS, MOVABLE BODY, AND AUDIO INFORMATION REPRODUCTION CONTROLLING SYSTEM

(75) Inventors: Michihiro Kaneko, Tsurugashima (JP); Koichi Nagaki, Tsurugashima (JP); Hajime Adachi, Tsurugashima (JP); Yoshikazu Takeuchi, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 161 days.

(21) Appl. No.: 09/725,809

(22) Filed: Nov. 30, 2000

(65) Prior Publication Data

US 2001/0053943 A1    Dec. 20, 2001

(30) Foreign Application Priority Data

Nov. 30, 1999  (JP)  ............................. P11-340603

(51) Int. Cl.
*G06F 17/00* (2006.01)
*H04B 1/00* (2006.01)

(52) U.S. Cl. ............................. 700/94; 381/86; 84/601

(58) Field of Classification Search ............. 381/86; 709/217–219; 700/94; 84/601, 602, 604
See application file for complete search history.

(56) References Cited

U.S. PATENT DOCUMENTS

| | | | | |
|---|---|---|---|---|
| 5,572,442 A * | 11/1996 | Schulhof et al. | ............ | 709/219 |
| 5,742,893 A * | 4/1998 | Frank | ........................ | 455/66.1 |
| 6,147,938 A * | 11/2000 | Ogawa et al. | ................ | 369/12 |
| 6,212,555 B1 * | 4/2001 | Brooks et al. | .............. | 709/219 |
| 6,301,513 B1 * | 10/2001 | Divon et al. | .................. | 700/94 |
| 6,381,452 B1 * | 4/2002 | Tien et al. | .................. | 455/344 |
| 6,629,000 B1 * | 9/2003 | Moon et al. | .................. | 700/94 |
| 2005/0013448 A1 * | 1/2005 | Berhan | ........................ | 381/86 |

* cited by examiner

*Primary Examiner*—Xu Mei
(74) *Attorney, Agent, or Firm*—Sughrue Mion, PLLC

(57) ABSTRACT

An audio information reproducing apparatus (NS) is provided with: a memory (HD) for storing audio information comprising a plurality of unit information, such as a plurality of music compositions; a transmitting device (HO) for transmitting correspondence information, such as music list information or the like, corresponding to each of the plurality of the unit information to an external portion; an obtaining device (HO) for obtaining reproduction control information to control a reproduction manner of each of the plurality of unit information from the external portion, the reproduction control information being generated on the basis of the transmitted correspondence information; and a controlling device (6) for reproducing the plurality of unit information from the memory while controlling the reproduction manner of each of the plurality of unit information in accordance with the obtained reproduction control information.

27 Claims, 7 Drawing Sheets

FIG. 4A

| RECORD No. | MUSIC TITLE | ARTIST NAME | MUSIC DATA |
|---|---|---|---|
| 1 | sasf fef asf fs | fgjcvbc | |
| 2 | asd swq dqs | xhft | |
| 3 | swd | liof | |

| REPRODUCTION No. | RECORD No. | MUSIC TITLE | ARTIST NAME | TONE CONTROL INFORMATION | | |
|---|---|---|---|---|---|---|
| | | | | LOW | MID | HIGH |
| 3 | 1 | sasf fef asf fs | fgjcvbc | 1 | 4 | 6 |
| 1 | 2 | asd swq dqs | -xhft | 4 | 6 | 1 |
| 2 | 3 | swd | liof | 8 | 2 | 7 |

PR

AUDIO INFORMATION REPRODUCING APPARATUS, MOVABLE BODY, AND AUDIO INFORMATION REPRODUCTION CONTROLLING SYSTEM

BACKGROUND OF THE INVENTION

1. Field of the Invention

The present invention relates to an audio information reproducing apparatus, a movable body having the audio information reproducing apparatus, and an audio information reproduction controlling system including the movable body. More particularly it relates to an audio information reproducing apparatus which can reproduce audio information while changing a reproduction manner of the audio information recorded in a movable body, and a movable body having the audio information reproducing apparatus, and an audio information reproduction controlling system including the movable body.

2. Description of the Related Art

There is a so-called MD (Mini Disc) as a recordable information record medium convenient for portability. Moreover, there is a portable player, which can record a plurality of music compositions onto the MD, which can be hand-carried and which can perform the reproduction within a car.

Moreover, it is researched to record a plurality of music compositions onto a so-called hard disc installed in a car, so that they are reproduced within the car.

Here, in case of the above mentioned MD and the above mentioned hard disc (hereafter, referred to as the MD and the like), a reproduction order of the respective music compositions and the like can be edited after the plurality of music compositions to be reproduced are once recorded.

At this time, when the editing process is carried out for the MD and the like, the record positions themselves of the respectively recorded music compositions on the MD and the like are not changed. Instead, reproduction control information indicative of the reproduction order of the music compositions and the like is changed and re-recorded (it is recorded on the MD and the like, together with the plurality of music compositions targeted for the reproduction. For example, in case of the MD, it is referred to as UTOC (User Table Of Contents) information). Then, the reproduction control is performed in accordance with the re-recorded reproduction control information, so that the reproduction order of the music compositions and the like is edited.

However, when the editing process is carried out within the car having the player for reproducing the MD and the like, a display, a switch and the like necessary for the editing operation become inevitably small because of the narrow space within the car. The usable number of them is also limited. Thus, this results in a problem that the execution of the sufficiently editing operation requires the installation of the editing apparatus having the complex configuration, such as a mechanism in which one switch is commonly used for two or more editing processes, within the car.

At this time, the above mentioned problem may be similarly induced in the portable player. Moreover, this problem leads to a problem that an editing operation desired by a user may not be sufficiently attained within the car.

Moreover, the attainment of the desired editing operation using the small display and the like may bring about a problem that the editing apparatus itself is expensive.

On the other hand, in case that a hard disc on which a plurality of music compositions are recorded is installed within a car, when the number of music compositions recorded on the hard disc is 10 or more, this case results in a problem that it needs a heavy labor only to retrieve from the hard disc a music composition or music compositions to be edited in the editing work within the car.

SUMMARY OF THE INVENTION

The present invention is proposed in view of the above mentioned problems. It is therefore an object of the present invention to provide an audio information reproducing apparatus, which can control a reproduction manner of audio information with a cheap configuration without complicating the audio information reproducing apparatus for a car and the like, and a movable body, which has such an audio information reproducing apparatus, and an audio information reproduction controlling system, which includes such a movable body and which can easily carry out the above-mentioned editing operation.

The above object of the present invention can be achieved by an audio information reproducing apparatus provided with: a memory, such as a hard disc or the like, for storing audio information, such as music information or the like, comprising a plurality of unit information, such as a plurality of music compositions or the like; a transmitting device, such as a portable telephone or the like, for transmitting correspondence information, such as music list information or the like, corresponding to each of the plurality of the unit information to an external portion; an obtaining device, such as a portable telephone or the like, for obtaining reproduction control information to control a reproduction manner of each of the plurality of unit information from the external portion, the reproduction control information being generated on the basis of the transmitted correspondence information; and a controlling device, such as a CPU or the like, for reproducing the plurality of unit information from the memory while controlling the reproduction manner of each of the plurality of unit information in accordance with the obtained reproduction control information.

According to the audio information reproducing apparatus of the present invention, since the reproduction manner of the unit information is controlled on the basis of the reproduction control information generated at the external portion, it is not necessary to generate the reproduction control information within the audio information reproducing apparatus, so that it is easy to control the reproduction manner of the unit information at the audio information reproducing apparatus.

Therefore, it is possible to reproduce the audio information in the various reproduction manners, without making the configuration of the audio information reproducing apparatus itself complicated and expensive.

In one aspect of the audio information reproducing apparatus of the present invention, each of the plurality of unit information is a music composition constituting the audio information, and the correspondence information includes at least one of music title information, which indicates each music composition, and partial music information, which is a part of each music composition.

According to this aspect, it is possible to control the reproduction manner of the unit information accurately on the basis of the reproduction control information, which is generated on the basis of the music title information or the partial music information.

In another aspect of the audio information reproducing apparatus of the present invention, the reproduction control information indicates a reproduction order of the plurality of unit information, and the controlling device controls the reproduction manner of each of the plurality of unit information in an order in accordance with the reproduction order.

According to this aspect, since the unit information is reproduced in accordance with the reproduction order indicated by the reproduction control information, it is possible to reproduce the unit information while easily controlling the reproduction order.

In another aspect of the audio information reproducing apparatus of the present invention, the apparatus is further provided with a displaying device for displaying a title of each of the plurality of unit information in accordance with the obtained reproduction control information.

According to this aspect, since the unit information is reproduced on the basis of the reproduction control information while displaying the title of the unit information, it is possible to reproduce the unit information while allowing the user to recognize the title of the unit information which is being reproduced.

In another aspect of the audio information reproducing apparatus of the present invention, the correspondence information is transmitted onto an electric communication line, and the reproduction control information is obtained through the electric communication line.

According to this aspect, it is possible to send and receive the correspondence information and the reproduction control information speedily.

In another aspect of the audio information reproducing apparatus of the present invention, the correspondence information is recorded onto an information record medium, such as a flexible disc or the like, and is then transferred, and the reproduction control information is obtained through the transferred information record medium.

According to this aspect, it is possible to send and receive the correspondence information and the reproduction control information accurately and surely.

The above object of the present invention can be also achieved by a movable body provided with the above described audio information reproducing apparatus of the present invention and a main body for moving.

According to the movable body of the present invention, since the reproduction manner of the unit information is controlled on the basis of the reproduction control information generated at the external portion, it is not necessary to generate the reproduction control information within the movable body, so that it is easy to control the reproduction manner of the unit information at the audio information reproducing apparatus.

In one aspect of the movable body of the present invention, the movable body is a car.

According to this aspect, it is not necessary to generate the reproduction control information within the rather narrow car, so that it is possible to reproduce the unit information within the car while easily controlling the reproduction manner of the unit information.

The above object of the present invention can be also achieved by an audio information reproduction controlling system provided with an audio information reproducing apparatus, a transferring device and a generating apparatus. The audio information reproducing apparatus is provided with: a memory, such as a hard disc or the like, for storing audio information, such as music information or the like, comprising a plurality of unit information, such as a plurality of music compositions; a transmitting device, such as a portable telephone or the like, for transmitting correspondence information corresponding to each of the plurality of the unit information to the transferring device; an obtaining device, such as a portable telephone or the like, for obtaining reproduction control information to control a reproduction manner of each of the plurality of unit information from the transferring device, the reproduction control information being generated on the basis of the transmitted correspondence information; and a controlling device, such as a CPU or the like, for reproducing the plurality of unit information from the memory while controlling the reproduction manner of each of the plurality of unit information in accordance with the obtained reproduction control information. The transferring device, such as a public communication line or the like, transfers the transmitted correspondence information to the generating apparatus and also transferring the reproduction control information to be obtained to the audio information reproducing apparatus. The generating apparatus, such as a personal computer or the like, generates the reproduction control information on the basis of the transferred correspondence information and then transmitting the generated reproduction control information to the transferring device, the generating apparatus and the audio information reproducing apparatus being separated from each other.

According to the audio information reproduction controlling system of the present invention, since the reproduction manner of the unit information is controlled at the audio information reproducing apparatus, on the basis of the reproduction control information generated at the generating apparatus which is separated from the audio information reproducing apparatus, it is not necessary to generate the reproduction control information within the audio information reproducing apparatus, so that it is easy to control the reproduction manner of the unit information at the audio information reproducing apparatus.

Therefore, it is possible to reproduce the audio information in the various reproduction manners within the movable body, without making the configuration of the audio information reproducing apparatus itself, which is equipped within the movable body, complicated and expensive.

In one aspect of the audio information reproduction controlling system of the present invention, each of the plurality of unit information is a music composition constituting the audio information, and the correspondence information includes at least one of music title information, which indicates each music composition, and partial music information, which is a part of each music composition.

According to this aspect, it is possible to control the reproduction manner of the unit information accurately on the basis of the reproduction control information, which is generated on the basis of the music title information or the partial music information.

In another aspect of the audio information reproduction controlling system of the present invention, the generating apparatus generates the reproduction control information indicating a reproduction order of the plurality of unit information, and the controlling device controls the reproduction manner of each of the plurality of unit information in an order in accordance with the reproduction order.

According to this aspect, since the unit information is reproduced in accordance with the reproduction order indicated by the reproduction control information, which is generated by the generating apparatus, it is possible for the audio information reproducing apparatus to reproduce the unit information while easily controlling the reproduction order.

In another aspect of the audio information reproduction controlling system of the present invention, the audio information reproducing apparatus is further provided with a displaying device for displaying a title of each of the plurality of unit information on the basis of the reproduction control information.

According to this aspect, since the unit information is reproduced at the audio information reproducing apparatus, on the basis of the reproduction control information while displaying the title of the unit information, it is possible to reproduce the unit information while allowing the user of the audio information reproducing apparatus to recognize the title of the unit information which is being reproduced.

In another aspect of the audio information reproduction controlling system of the present invention, the transferring device includes an electric communication line.

According to this aspect, it is possible to speedily send and receive the correspondence information and the reproduction control information between the audio information reproducing apparatus and the generating apparatus.

In another aspect of the audio information reproduction controlling system of the present invention, the transferring device includes an information record medium, such as a flexible disc or the like.

According to this aspect, it is possible to accurately and surely send and receive the correspondence information and the reproduction control information between the audio information reproducing apparatus and the generating apparatus.

In another aspect of the audio information reproduction controlling system of the present invention, the audio information reproducing apparatus is mounted on a movable body and the generating apparatus includes a personal computer.

According to this aspect, it is not necessary to generate the reproduction control information within the rather narrow car, so that it is possible to reproduce the unit information within the car while easily controlling the reproduction manner of the unit information.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 4A is a diagram showing an example of music list information in the embodiment;

FIG. 4B is a diagram showing an example of reproduction control information in the embodiment;

DETAILED DESCRIPTION OF THE PREFERRED EMBODIMENTS

Preferred embodiments of the present invention will be explained below with reference to the drawings.

In the following embodiment, the present invention is applied to a music information reproduction controlling system including: an information recording and reproducing apparatus, which is installed within a car, has a navigation function of assisting or navigating a movement of the car while displaying a map and the like, and also has a function of copying music information onto a hard disc within a later-described HD (Hard Disc) drive in parallel to the reproduction of the music information recorded on a CD (Compact Disc) or a later-described DVD audio disc within the car; and a personal computer, which can send and receive later-described reproduction control information and music list information to and from the information recording and reproducing apparatus within the car. The music information reproduction controlling system controls a reproduction manner of the music information in the information recording and reproducing apparatus within the car, in accordance with the reproduction control information generated by the personal computer.

(I) Embodiment

At first, an embodiment of the present invention is described with reference to FIG. 1 to FIG. 4B.

Figure 1:
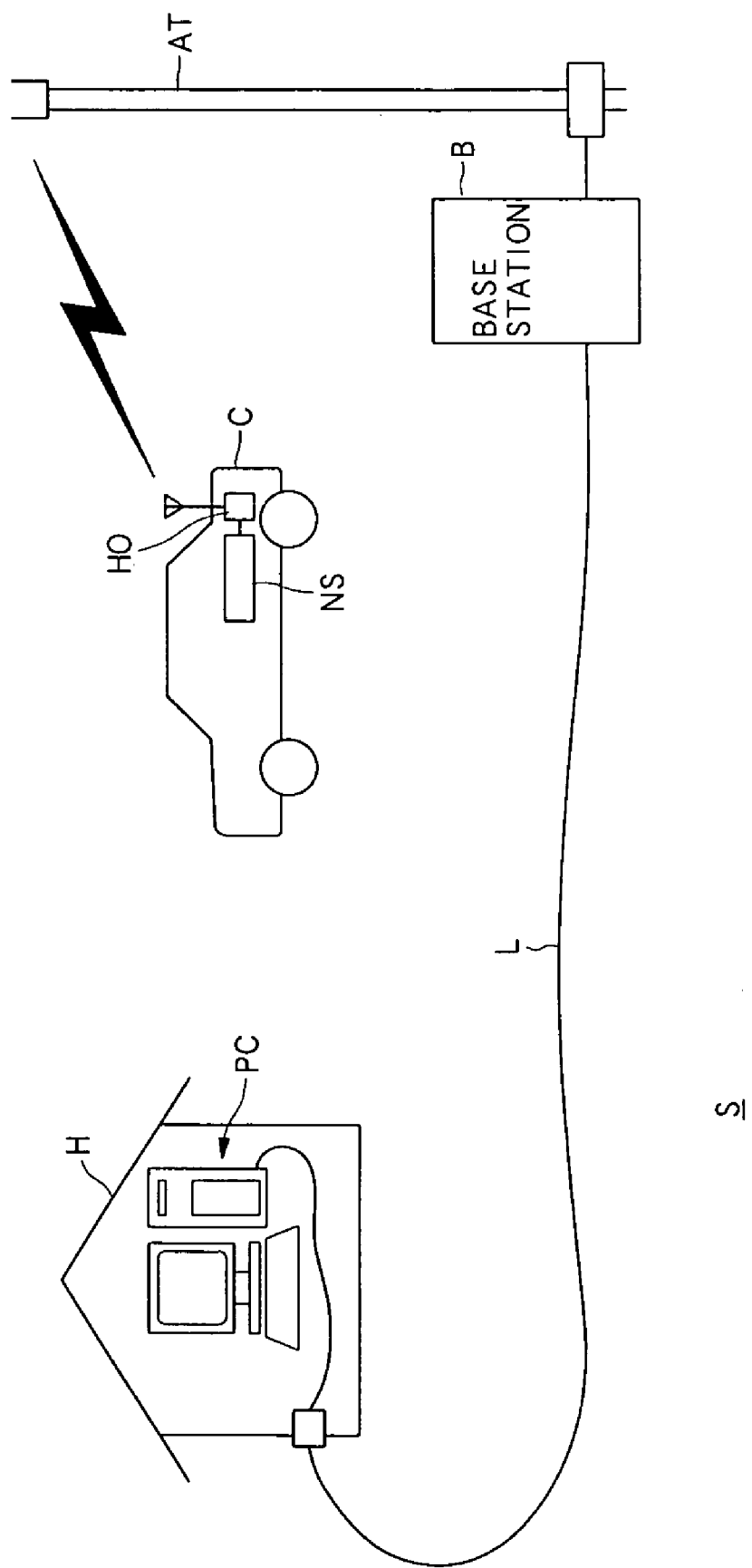
FIG. 1 is a block diagram showing a schematic configuration of a music information reproduction controlling system as an embodiment of the present invention.
Figure 2:
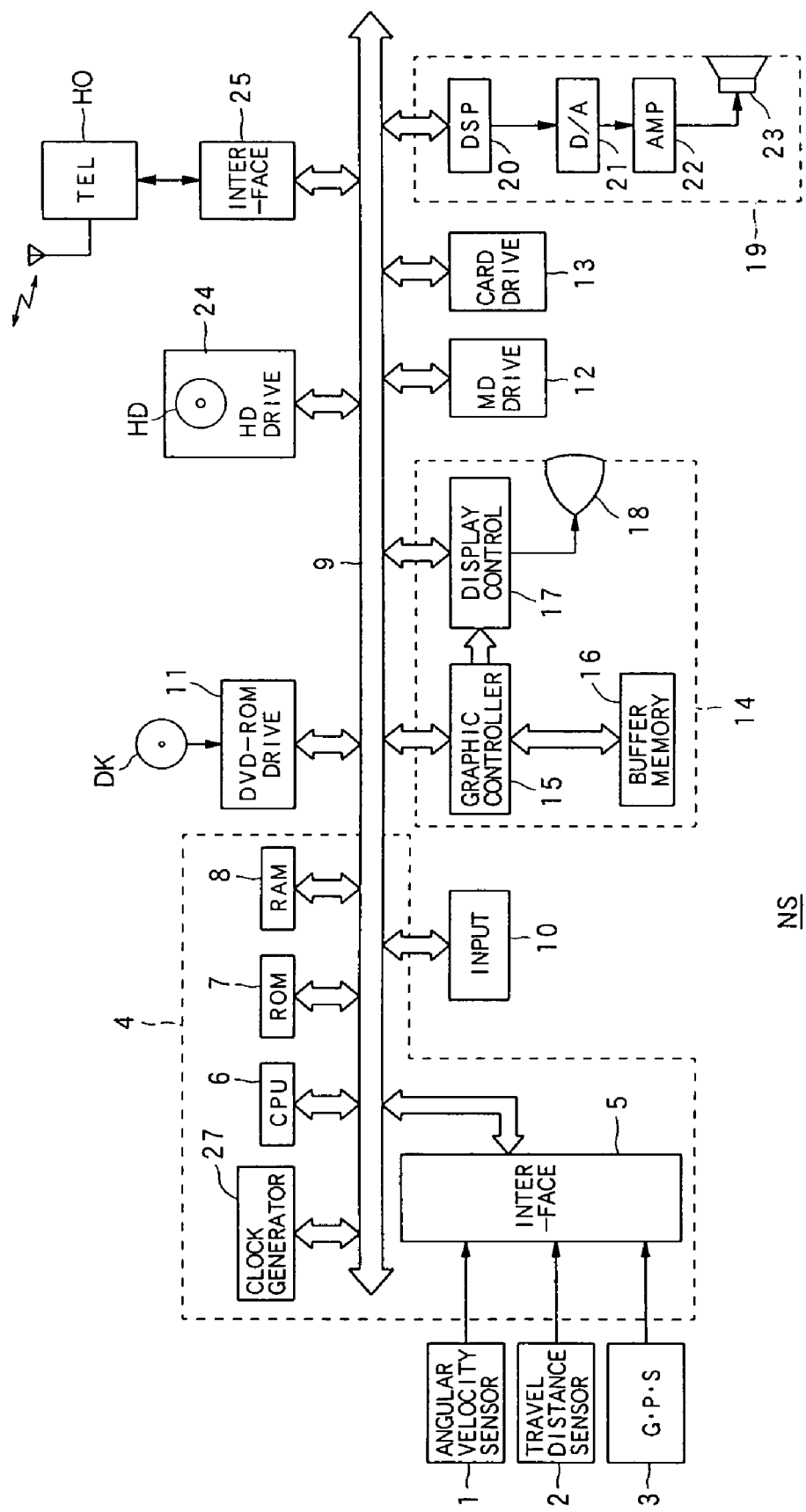
FIG. 2 is a block diagram showing a schematic configuration of an information recording and reproducing apparatus in the music information reproduction controlling system of the embodiment.
Figure 3:
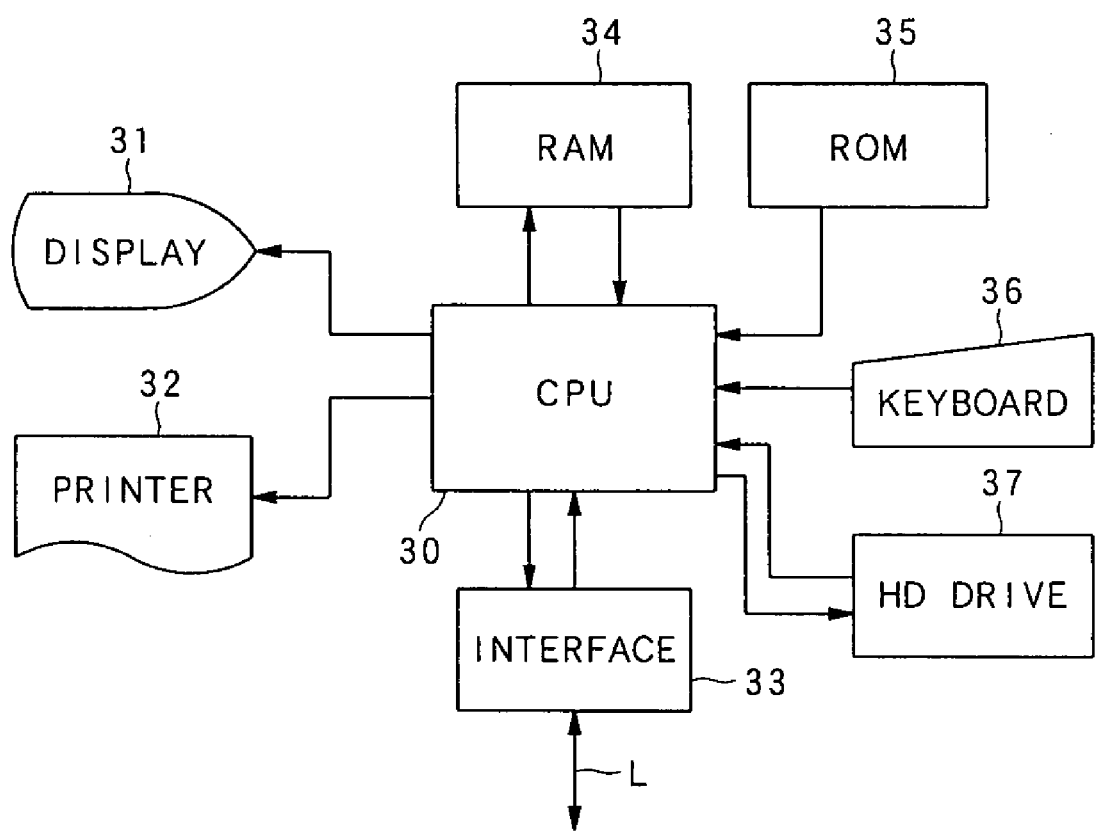
FIG. 3 is a block diagram showing a schematic configuration of a personal computer in the music information reproduction controlling system of the embodiment.

FIG. 1 is a block diagram showing the schematic configuration of the music information reproduction controlling system as the embodiment. FIG. 2 is a block diagram showing the schematic configuration of the information recording and reproducing apparatus within the car, which is included in the music information reproduction controlling system. FIG. 3 is a block diagram showing the schematic configuration of the personal computer, which is included in the music information reproduction controlling system. FIG. 4A is a diagram showing an example of the later-described music list information, which is sent and received within the music information reproduction controlling system. FIG. 4B is a diagram showing an example of the later-described reproduction control information, which is sent and received within the music information reproduction controlling system.

As shown in FIG. 1, a music information reproduction controlling system S as the embodiment is provided with: a personal computer PC serving as one example of a generating apparatus installed within a house H; an information recording and reproducing apparatus NS installed within a car C serving as one example of a movable body; a portable telephone HO serving as one example of a transmitting device and one example of an obtaining device constituting an electric communication line as one example of a transferring device for sending and receiving the later-described reproduction control information and music list information as corresponding information between the personal computer PC and the information recording and reproducing apparatus NS; a base station B having an antenna AT; and a public line L which is a wire line.

Next, the configurtion and the operation of the information recording and reproducing apparatus NS within the car in the embodiment will be described below with reference to FIG. 2.

As shown in FIG. 2, the information recording and reproducing apparatus NS in the embodiment is provided with: an angular velocity sensor 1 for detecting an angular velocity at a time of a direction change of a self-car and then outputting angular velocity data and relative azimuth data; a travel distance sensor 2 for counting the number of pulses in a pulse signal outputted in conjunction with a wheel rotation, and accordingly calculates the number of pulses per wheel rotation and then outputting travel distance data based on the number of pulses per rotation; a GPS receiver 3 for receiving an electric wave from a GPS (Global Positioning System) satellite, outputting GPS measurement data and outputting absolute azimuth data in a travel direction of the self-car; a system controller 4 for detecting a position of the self-car, controlling the navigation function and controlling the information recording and reproducing apparatus NS as a whole; and an input device 10, such as a remote controller and the like, for inputting various data.

In addition to them, the information recording and reproducing apparatus NS is provided with: a DVD-ROM drive 11 for reading out record information from a DVD-ROM (DVD-Read Only Memory) disc (not shown) on which map information, road information or the like is recorded for a navigation function when the navigation function is desired to be used in the information recording and reproducing apparatus NS, and then outputting it to a bus line 9; an MD drive 12 for reading out record information, such as music information or the like, from the MD, and outputting it to the bus line 9; a card drive 13 for recording to or reproducing from a writable information record medium such as a flexible disc, a memory card or the like (not shown); a display unit 14 serving as one example of a displaying device for displaying various display data under a control of the system controller 4; an audio reproducing unit 19 for reproducing and outputting various music data under the control of the system controller 4; and an HD drive 24 containing a hard disc HI) serving as one example of a memory; and an interface 25 for carrying out an interface operation with the portable telephone HO.

The system controller 4 is provided with: an interface 5 for carrying out an interface operation with the external sensors such as the GPS receiver 3 and the like; a CPU 6 serving as one example of a controlling device for controlling the system controller 4 as a whole; an ROM 7 in which a basic control program to control the system controller 4 and the like are stored; an RAM (Random Access Memory) 8 having a non-volatile memory (not shown) and the like, in which system setting information pre-set by a user through the input device 10 is stored in a readable manner; and a clock generator 27 for clocking a current time and the like, in accordance with time data from the GPS satellite especially received by the GPS receiver 3. The input device 10, the DVD-ROM drive 11, the MD drive 12, the card drive 13, the display unit 14 and the audio reproducing unit 19 are connected through the bus line 9 to each other.

Moreover, the display unit 14 is provided with: a graphic controller 15 for controlling the display unit 14 as a whole, in accordance with control data sent from the CPU 6 through the bus line 9; a buffer memory 16 having a VRAM (Video RAM) and the like for transiently storing therein instantly displayable picture information; and a display controller 17 for controlling a displaying operation of a display 18, such as a liquid crystal panel, a CRT (Cathode Ray Tube) or the like, in accordance with the picture data received from the graphic controller 15.

The audio reproducing unit 19 is provided with: a DSP (Digital Signal Processor) 20 for digitally process the digital data sent through the bus line 9 from the DVD-ROM drive 11, the MD drive 12 or the RAM 8 (e.g., the audio digital data for navigation or the music information) in accordance with the later-described reproduction control information; a D/A converter 21 for performing a D/A conversion on the processed digital music information; an amplifier 22 for amplifying an analog signal outputted from the D/A converter 21; and a speaker 23 for converting the amplified analog signal into a sound and outputting it. The DSP 20 has a function of expanding compressed music information when the music information to be reproduced is the compression music information.

Here, when an DVD audio disc DK on which the music information composed of a plurality of music compositions is recorded is mounted in the DVD-ROM drive 11, the DVD-ROM drive 11 decodes and reproduces the respective music compositions from the DVD audio disc DK, and then outputs them through the bus line 9 to the HD drive 24 or the audio reproducing unit 19.

In addition, the DVD-ROM drive 11 has the compatibility so that the music information can be reproduced from a CD-ROM or a CD on which the music information is recorded.

On the other hand, when the navigation function is used in the information recording and reproducing apparatus NS, the map information recorded on the above DVD-ROM disc (not shown) is read out by the DVD-ROM drive 11 to then carry out a process of displaying it on the display 17, a route guiding process using a map corresponding to the map information, a map matching process or the like, and also the map information necessary for perform the navigation function is transferred to and stored into the hard disc HD, at a predetermined suitable timing.

At this time, the transfer of the map information is targeted for each map data block within a region defined in accordance with a predetermined condition with respect to a position of a self-car as a standard. The map data once stored in the hard disc HD is maintained as it is unless it is removed. After that, the navigation function can be performed by reading out the map information through the HD drive 24 from the hard disc HD, instead of the DVD-ROM. In this case, a fast navigation function can be performed by reading out the various data from the hard disc HD in which a faster access (a reading and recording operation) can be performed as compared with the DVD-ROM disc.

The music information outputted from the MD drive 12 or the DVD-ROM drive 11 into which the DVD audio disc DK is inserted can be recorded through the bus line 9 into the hard disc HD. At this time, both the music information and the map information used for the navigation function can be recorded into the hard disc HD.

Finally, the interface 25 obtains through the bus line 9 the later-described music list information corresponding to each music in the music information recorded in the hard disc HD, and outputs it to the portable telephone HO, and also outputs the later-described reproduction control information inputted from the portable telephone HO, through the bus line 9 to the system controller 4 and the audio 10 reproducing unit 19.

Next, the configuration and the operation of the personal computer PC in the embodiment will be described below with reference to FIG. 3.

As shown in FIG. 3, the personal computer PC is provided with a CPU 30, a display 31, a printer 32, an interface 33, a RAM 34, a ROM 35, a keyboard 36 and an HD drive 37.

Next, the schematic operation will be described below.

The later-described music list information from the portable telephone HO is inputted through the antenna AT, the base station B, the public line L and the interface 33 to the CPU 30. As necessary, it is displayed on the display 31.

When an input operation to generate the later-described reproduction control information is carried out in accordance with the displayed music list information, an input signal corresponding to the input operation is outputted from the keyboard 36 to the CPU 30.

Then, the CPU 30 generates the later-described reproduction control information based on the input signal, and outputs it through the interface 33, the public line L, the base station B, the antenna AT and the portable telephone HO to the information recording and reproducing apparatus NS within the car.

At this time, a control program required to generate the reproduction control information is stored in advance in a hard disc (not shown) within the HD drive 37, and is read out as the occasion demands.

The data transiently required at the time of generating the reproduction control information and the like are transiently stored in the RAM 34 or the hard disc, and is read out as the occasion demands.

Moreover, for example, when the content of the generated reproduction control information is to be checked, the printer 32 is used to print out the reproduction control information.

Next, the detailed configurations of the music list information and the reproduction control information which are sent and received in the music information reproduction controlling system S having the above-mentioned configuration will be described below together with the music information reproduction control process according to the present invention, with reference to FIG. 4A and FIG. 4B.

At first, as shown in FIG. 4A, music list information ML is generated by the CPU 6 in the information recording and reproducing apparatus NS, in correspondence with respective music compositions included in the music information recorded within the hard disc HD. Actually, it has a record number indicative of a record order of the respective music compositions in the hard disc HD, each music title corresponding to the record number, an artist (singer) name of each music corresponding to the record number, and music data that is a part of each music itself (actually, this music itself has a length (about 1 to 5 seconds) through which a so-called patina portion, a remarkable melody portion or a content of each music can be approximately identified) corresponding to the record number.

The music list information ML is generated by the CPU 6 with referring to the contents of the music compositions in the hard disc HD. When an easy operation indicating to transmit the music list information ML to the personal computer PC is carried out by the input device 10 in the information recording and reproducing apparatus NS, the music list information ML is sent through the bus line 9, the interface 25, the portable telephone HO, the antenna AT, the base station B and the public line L to the personal computer PC within the house H. Accordingly, the personal computer PC within the house H obtains the sent music list information ML through the interface 33, and records and stores it into the hard disc in the HD drive 37.

Next, the user, who tries to edit the reproduction manner of the music information within the car, operates the personal computer PC, and carries out the editing operation (namely, an operation for preparing a later-described reproduction control information PR) of the recorded and stored music list information ML.

In this case, the CPU 30 reads out the music list information ML which is recorded and stored in the HD drive 37, and displays it on the display 31. Then, it prepares the reproduction control information PR as described below, in accordance with the input operation at the keyboard 36 by the user. That is, the music list information ML sent from the information recording and reproducing apparatus NS within the car is edited by the personal computer PC within the house H.

In this case, the CPU 30 reads out the music title list information ML which is recorded and stored in the HD drive 37, and displays it on the display 31. Then, it prepares the reproduction control information PR as described below, in accordance with the input operation at the keyboard 36 by the user. That is, the music title list information ML sent from the information recording and reproducing apparatus NS within the car is edited by the personal computer PC within the house H.

Actually, when the user carries out an editing operation for changing a music title or an artist name to a name desired by the user, an editing operation for specifying a reproduction order of music compositions, an editing operation for specifying a tone at a time of the reproduction or the like by using the keyboard 36 etc., the CPU 30 generates the reproduction control information PR reflecting the editing operation, in accordance with the editing operation of the user. Then, the generated reproduction control information PR is transiently recorded and stored in the HD drive 37.

By the way, a series of those editing operations is carried out in software by the user using a music list information edition program which is stored in advance in the HD drive 37 or the ROM 35.

Next, the content of the reproduction control information PR generated by the edition operations actually includes a reproduction number indicative of the reproduction order for each music composition when the music information is reproduced in the information recording and reproducing apparatus NS and tone control information to control a tone for each music composition at the time of the reproduction, in addition to the record number, the music title and the artist name sent as the music list information ML, as shown in FIG. 4B.

Here, the tone control information includes level information indicative of an output tone pressure level at the time of the reproduction in each frequency range, for each music composition, in case that each music composition is divided into a low frequency range (Low), a middle frequency range (Mid) and a high frequency range (High).

By the way, the music data of each music composition, which is sent while it is included in the music list information ML, is reproduced and outputted from a speaker (not shown) within the personal computer PC, when the identification of each music composition is required in preparing the reproduction control information PR.

Then, the CPU 30 referrers to the music list information ML to accordingly generate the reproduction control information PR. When the user carries out the operation indicative of the transmission (reply) of the reproduction control information PR to the information recording and reproducing apparatus NS by using the keyboard 36 within the personal computer PC, the reproduction control information PR is read out from the HD drive 37, and is sent through the interface 33, the public line L, the base station B, the antenna AT and the portable telephone HO to the information recording and reproducing apparatus NS. At this time, the reproduction control information PR received by the portable telephone HO is sent through the interface 25 to the HD drive 24, and is recorded into the hard disc HD.

By this, the CPU 6 in the information recording and reproducing apparatus NS reads out the sent reproduction control information PR from the hard disc HD, and displays it on the display 18, in case that the music information recorded in the hard disc HD is to be reproduced and outputted. If the user instructs the start of the reproduction, the CPU 6 controls the HD drive 24 so that each music composition in the music information is reproduced in the reproduction order based on the reproduction number included in the reproduction control information PR.

Accordingly, the DSP 20 controls the tone in each reproduced music composition in accordance with the tone control information included in the reproduction control information PR, and reproduces and outputs the music information through the D/A converter 18, the amplifier 19 and the speaker 20 into the car C.

As mentioned above, according to the operation of the music information reproduction controlling system S of the embodiment, the reproduction manner of the music within the car C is controlled in accordance with the reproduction control information PR generated by the personal computer PC fixed within the house H. Thus, the reproduction manner of the music within the car C can be easily controlled without the necessity of generating the reproduction control information PR within the car C and without making the configuration of the information recording and reproducing apparatus NS itself complex and expensive.

Also, the music list information ML includes the music data, which is a part of each music composition, and/or the music title indicative of each music composition. Thus, the reproduction manner of the music composition can be accurately controlled within the car, in accordance with the reproduction control information PR generated by the personal computer PC based on the music data or the music title.

Moreover, the music composition is reproduced within the car C in accordance with the reproduction order indicated by the reproduction control information PR generated by the personal computer PC. Thus, the music composition can be reproduced within the car C while the reproduction order is easily controlled.

Furthermore, the music list information ML and the reproduction control information PR are sent and received by using the public line L, the base station B, the portable telephone HO and the like. Thus, the music list information ML and the reproduction control information PR can be quickly sent and received between the car C and the personal computer PC.

By the way, when each music composition is reproduced in the information recording and reproducing apparatus NS, it may be designed to carry out the reproduction while displaying on the display unit 12 the music title of the music currently being reproduced, by using the music title included in the reproduction control information PR.

In this case, while the music title is displayed, the music is reproduced in accordance with the reproduction control information PR. Thus, it is possible to reproduce the music composition while making a passenger such as a driver and the like recognize the music title currently being reproduced.

Also, as the personal computer PC, a portable personal computer may be naturally used besides the type fixed within the house. In this case, it is also necessary that the portable telephone HO serving as one example of the transmitting device is connected to the portable personal computer.

(II) Modified Embodiments

Modified embodiments of the present invention will be described below with reference to FIG. 5 to FIG. 7.

Figure 5:
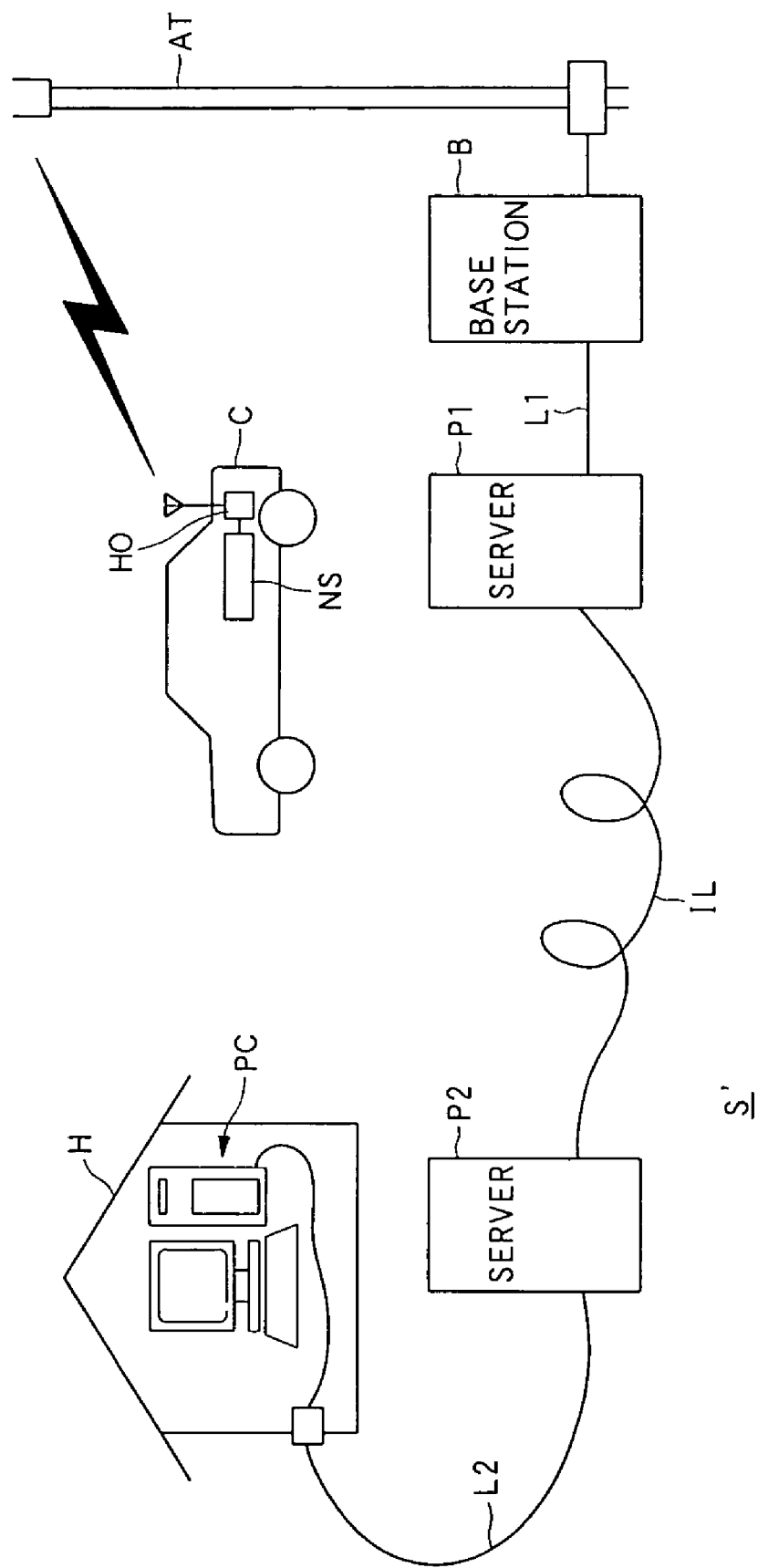
FIG. 5 is a block diagram showing a schematic configuration of a music information reproduction controlling system as another embodiment of the present invention.

FIG. 5 is a block diagram showing a schematic configuration of a music information reproduction controlling system as a first modified embodiment. FIG. 6 is a block diagram showing a schematic configuration of a music information reproduction controlling system as a second modified embodiment. FIG. 7 is a block diagram showing a configuration of an information recording and reproducing apparatus as a third modified embodiment.

In the above-mentioned music information reproduction controlling system S shown in FIG. 1 to FIG. 3, the public line L, the base station B, the portable telephone HO and the like are used to connect the personal computer PC and the information recording and reproducing apparatus NS within the car to each other, and then the music list information ML and the reproduction control information PR are sent and received between them. However, the music list information ML and the reproduction control information PR can be sent and received between the information recording and reproducing apparatus NS and the personal computer PC which are connected to each other by using another connection device.

That is, as the first modified embodiment, it may be designed such as a music information reproduction controlling system S' shown in FIG. 5. That is, public lines L1 and L2, internet servers P1 and P2 and an internet line IL are inserted between the base station B and the personal computer PC so that the music list information ML and the reproduction control information PR are sent and received between them.

In this case, the music list information ML and the reproduction control information PR are respectively converted into the forms of so-called electronic mails or a-mails in the information recording and reproducing apparatus NS and the personal computer PC. Then, they are sent and received.

Figure 6:
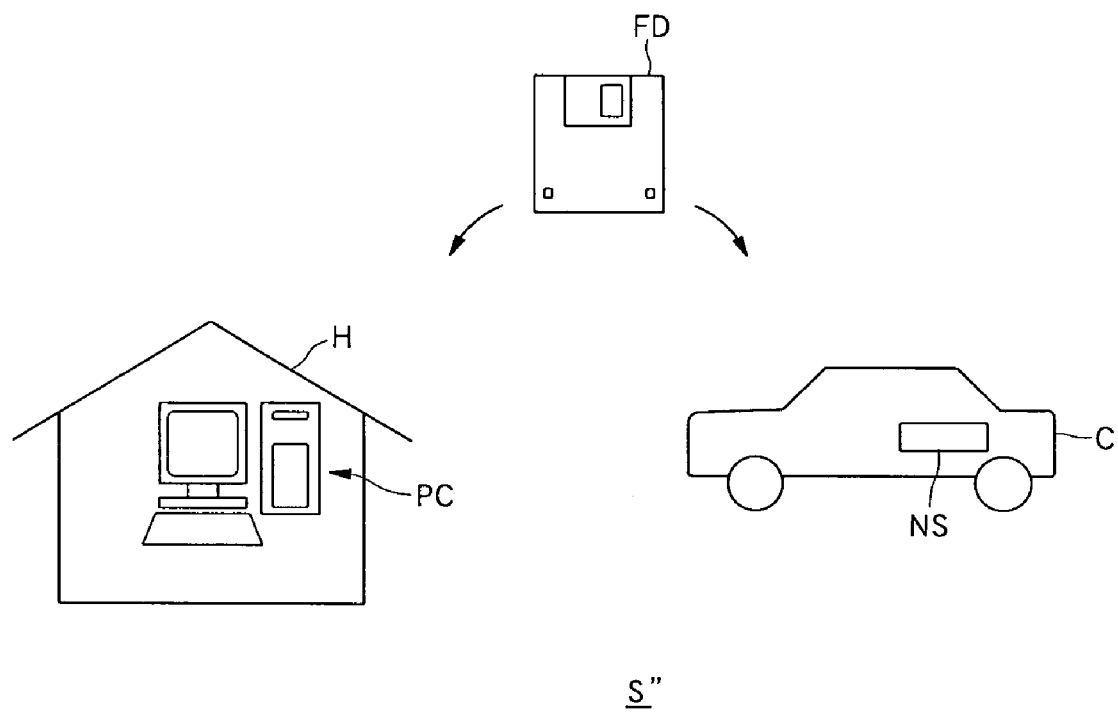
FIG. 6 is a block diagram showing a schematic configuration of a music information reproduction controlling system as another embodiment of the present invention.

Moreover, as the second modified embodiment, it may be designed such as a music information reproduction controlling system S" shown in FIG. 6. That is, without using the wire and wireless lines, the music list information ML and the reproduction control information PR are recorded in a memory card (not shown) or a flexible disc FD serving as one example of an information record medium which is a magnetic record medium. Then, the flexible disc FD or the memory card is sent and received between the personal computer PC and the car C to thereby transmit the music list information ML and the reproduction control information PR.

At this time, when the flexible disc FD is used to transmit the music list information ML and the reproduction control information PR, it is necessary that a recording and reproducing apparatus, which can record and reproduce the music list information ML and the reproduction control information PR into and from the flexible disc FD, is installed in both the personal computer PC and the information recording and reproducing apparatus NS. Moreover, when the memory card is used to transmit the music list information ML and the reproduction control information PR, it is necessary that a recording and reproducing apparatus, which can record and reproduce the music list information ML and the reproduction control information PR into and from the memory card (corresponding to the card drive 13 in the information recording and reproducing apparatus NS of the embodiment), is installed in both the personal computer PC and the information recording and reproducing apparatus NS.

In a case of the second modified embodiment, the flexible disc FD or the memory card is used to send and receive the music list information ML and the reproduction control information PR. Thus, as compared with the case of the interposition of the wire and wireless lines, the music list information ML and the reproduction control information PR can be sent and received between the car C and the personal computer PC accurately and surely.

Figure 7:
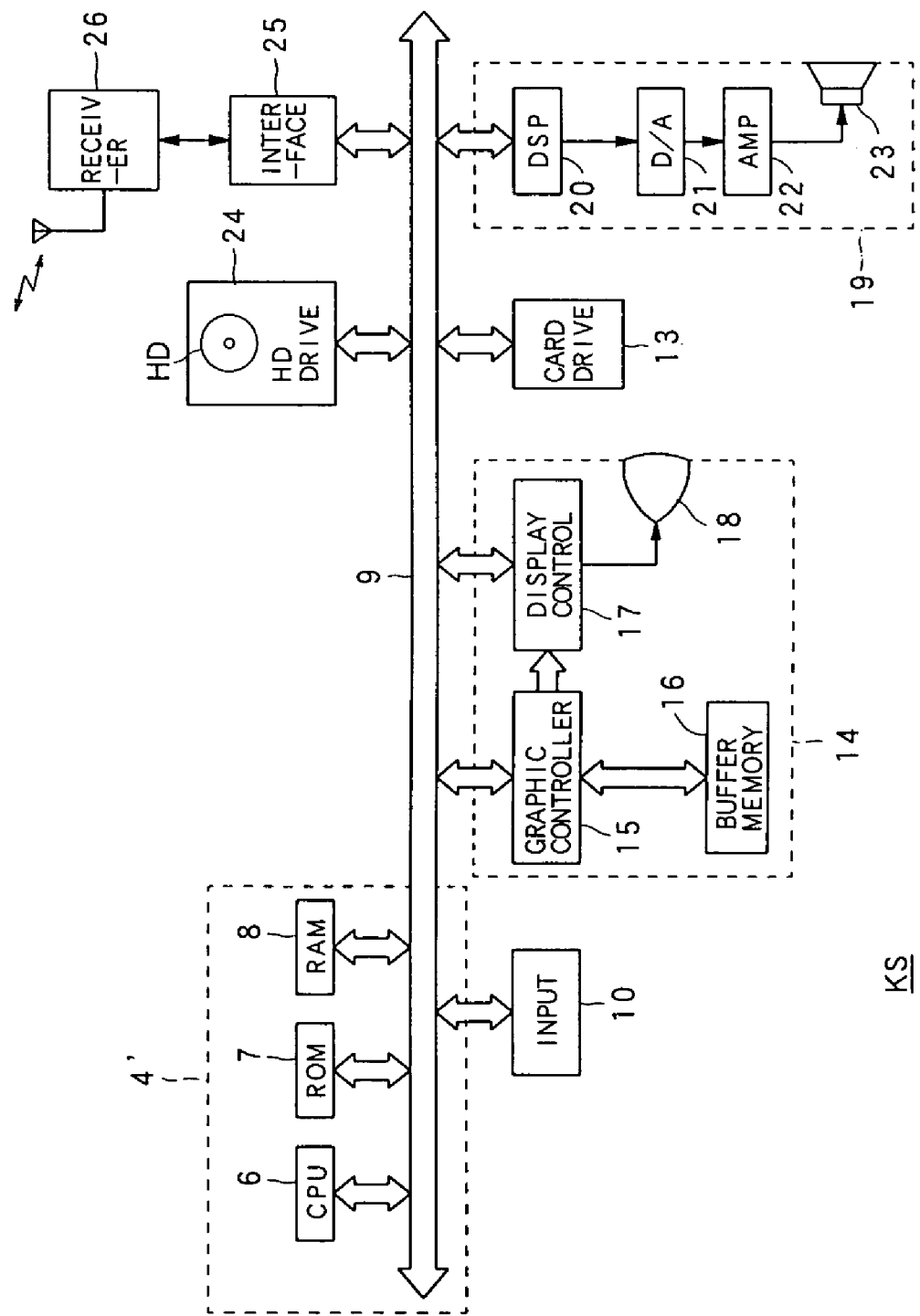
FIG. 7 is a block diagram showing a configuration of an information recording and reproducing apparatus as another embodiment of the present invention.

Furthermore, as the third modified embodiment, besides the information recording and reproducing apparatus NS designed for the above-mentioned car installation, a structure for reproducing the music information in accordance with the reproduction control information PR can be assembled into a portable information recording and reproducing apparatus KS having a schematic configuration whose block diagram is shown in FIG. 7.

That is, as shown in FIG. 7, a system controller 4' having the CPU 6, the ROM 7 and the RAM 8 which are similar to those of the information recording and reproducing apparatus NS in the embodiment, the input device 10, the card drive 13, the display unit 14, the audio reproducing unit 19, the HD drive 24 and the interface 25 which are also similar to those of the embodiment, and a receiver 26 having a function of sending and receiving the music list information ML and the reproduction control information PR which are similar to those of the portable telephone HO in the information recording and reproducing apparatus NS constitute the portable information recording and reproducing apparatus KS. Then, the music list information ML and the reproduction control information PR which are similar to those of the embodiment are sent and received between the information recording and reproducing apparatus KS and the personal computer PC similar to that of the embodiment. Accordingly, it may be designed to control the reproduction manner of the music information in the information recording and reproducing apparatus KS, in accordance with the reproduction control information PR.

By the way, the case in which the reproduction control information PR includes the information indicative of the reproduction order and the tone control information is described in the embodiment and the respective modified embodiments. However, it may include another information to control a sound volume and a reproduction speed at a time of reproduction.

Moreover, the music list information ML may include record position information indicative of a record position on the hard disc HD of each music composition (e.g., a pointer indicative of the record position) for each music composition.

Furthermore, the case in which the structure for reproducing the music information in accordance with the reproduction control information PR is assembled in the information recording and reproducing apparatus NS is described in the embodiment and the respective modified embodiment. However, besides it, this structure for reproducing the music information may be assembled as a part of a so-called car audio apparatus to be singly installed within the car C.

Also, it may be designed to connect the information recording and reproducing apparatuses NS and KS through the portable telephone HO to an external music information database for storing therein a large number of music information (songs) (actually, for example, a music information server for storing therein various digital music information existing on the Internet), and accordingly, a music desired by a user is obtained (i.e., downloaded) from the music information database, and is then recorded in the hard disc HD.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 11-340603 filed on Nov. 30, 1999 including the specification, claims, drawings and summary is incorporated herein by reference in its entirety.

What is claimed is:

1. An audio information processing apparatus in an audio information reproduction controlling system comprising: the audio information processing apparatus; a generating apparatus; and a transferring device located at an external portion to both the audio information processing apparatus and the generating apparatus, wherein the audio information processing apparatus communicates with the generating apparatus via the transferring device, the audio information processing apparatus comprising:

a storage device which stores audio information comprising a plurality of unit information;

a correspondence information generating device which generates correspondence information corresponding to each of the plurality of unit information, the correspondence information indicating a content of each of the plurality of unit information;

a transmitting device which transmits the correspondence information to the generating apparatus via the transferring device;

an obtaining device which obtains reproduction control information generated by the generating apparatus on the basis of the transmitted correspondence information and received via the transferring device, the reproduction control information being information which controls a reproduction manner when the stored audio information is reproduced;

a reproducing device which reproduces the stored audio information; and a controlling device which controls the reproduction manner of the reproducing device in accordance with the obtained reproduction control information, wherein each of the plurality of unit information is a music composition constituting the audio information;

the correspondence information includes partial music information which is a part of each music composition; and the reproduction control information is generated on the basis of the partial music information by the generating apparatus so that the reproduction control information includes information indicating an order of reproduction of music compositions.

2. The audio information processing apparatus according to claim 1, wherein the correspondence information is music list information which includes at least one of music title information and the partial music information, the music title information indicating each music composition.

3. The audio information processing apparatus according to claim 1, wherein the controlling device controls the reproduction manner of each of the plurality of unit information in an order in accordance with the reproduction order.

4. The audio information processing apparatus according to claim 1, further comprising a displaying device which displays a title of each of the plurality of unit information in accordance with the obtained reproduction control information.

5. The audio information processing apparatus according to claim 1, wherein
the correspondence information is recorded onto an information record medium and is then transferred, and
the reproduction control information is obtained through the transferred information record medium.

6. A movable body comprising an audio information processing apparatus in an audio information reproduction controlling system comprising the audio information processing apparatus; a generating apparatus; and a transferring device located at an external portion to both the audio information processing apparatus and the generating apparatus, wherein the audio information processing apparatus communicates with the generating apparatus via the transferring device, and a main body for moving, wherein
the audio information processing apparatus comprises:
a storage device which stores audio information comprising a plurality of unit information;
a correspondence information generating device which generates correspondence information corresponding to each of the plurality of unit information, the correspondence information indicating a content of each of the plurality of unit information;
a transmitting device which transmits the correspondence information to the generating apparatus via the transferring device;
an obtaining device which obtains only reproduction control information generated by the generating apparatus on the basis of the transmitted correspondence information and received via the transferring device, the reproduction control information being information which controls a reproduction manner when the stored audio information is reproduced;
a reproducing device which reproduces the stored audio information; and
a controlling device which controls the reproduction manner of the reproducing device in accordance with the obtained reproduction control information,
wherein each of the plurality of unit information is a music composition constituting the audio information;
the correspondence information includes partial music information which is a part of each music composition; and
the reproduction control information is generated on the basis of the partial music information by the generating apparatus so that the reproduction control information includes information indicating an order of reproduction of music compositions.

7. The movable body according to claim 6, wherein the movable body comprises a car.

8. An audio information reproduction controlling system comprising an audio information processing apparatus; and a generating apparatus; and a transferring device located at an external portion to both the audio information processing apparatus and the generating apparatus, wherein the audio information processing apparatus communicates with the generating apparatus via the transferring device,
(i) the audio information processing apparatus comprising:
a storage device which stores audio information comprising a plurality of unit information;
a transmitting device which transmits correspondence information corresponding to each of the plurality of unit information to the generating apparatus via the transferring device, the correspondence information indicating a content of each of the plurality of unit information;
an obtaining device which obtains reproduction control information generated by the generating apparatus on the basis of the transmitted correspondence information and received via the transferring device, the reproduction control information being information which controls a reproduction manner when the audio information is reproduced;
a reproducing device which reproduces the audio information; and
a controlling device which controls the reproduction manner of the reproducing device in accordance with the obtained reproduction control information,
wherein each of the plurality of unit information is a music composition constituting the audio information;
the correspondence information includes partial music information which is a part of each music composition; and
the reproduction control information is generated on the basis of the partial music information by the generating apparatus so that the reproduction control information includes information indicating an order of reproduction of music compositions,
(ii) the transferring device transferring the transmitted correspondence information to the generating apparatus and also transferring the reproduction control information to be obtained to the audio information processing apparatus,
(iii) the generating apparatus generating the reproduction control information on the basis of the transferred correspondence information and then transmitting the generated reproduction control information to the audio information processing apparatus via the transferring device, the generating apparatus and the audio information processing apparatus being separated from each other.

9. The audio information reproduction controlling system according to claim 8, wherein
the controlling device controls the reproduction manner of each of the plurality of unit information in an order in accordance with the reproduction order.

10. The audio information reproduction controlling system according to claim 8, wherein the audio information processing apparatus further comprises a displaying device which displays a title of each of the plurality of unit information on the basis of the reproduction control information.

11. The audio information reproduction controlling system according to claim 8, wherein the transferring device comprises an electric communication line.

12. The audio information reproduction controlling system according to claim 8, wherein the transferring device comprises an information record medium.

13. The audio information reproduction controlling system according to claim 8, wherein the audio information processing apparatus is mounted on a movable body and the generating apparatus comprises a personal computer.

14. A reproducing apparatus, comprising:
a memory which stores a plurality of audio information;
a identifying information generating device which generates identifying information that identifies the plurality of audio information stored in the memory;
an input/output circuit which outputs the identifying information and which receives control information, the control information being generated externally to the reproducing apparatus based on the identifying information; and a control circuit which controls a reproduction of the plurality of audio information from the memory based on the control information wherein the identifying information includes partial music information which is a part of the audio information; and the control information is generated on the basis of the partial music information so that the control information includes information indicating an order of reproduction of the audio information.

15. The reproducing apparatus as claimed in claim 14, wherein the plurality of audio information comprises at least a first song and a second song, and wherein the identifying information identifies the first song and the second song.

16. The reproducing apparatus as claimed in claim 15, wherein the control information indicates an order in which at least the first song and the second song are to be reproduced by the reproducing apparatus.

17. The reproducing apparatus as claimed in claim 15, wherein the identifying information comprises at least one of music title information and partial song information, wherein the music title information identifies the title of at least the first song and the second song, and wherein the partial song information comprises only portions of at least the first song and the second song, respectively.

18. The reproducing apparatus as claimed in claim 16, wherein the order in which at least the first song and the second song are to be reproduced is different from an order in which at least the first song and the second song were stored in the memory.

19. The reproducing apparatus as claimed in claim 16, wherein the control information indicates a tone at which at least the first song and the second song are to be reproduced.

20. The reproducing apparatus as claimed in claim 14, wherein the input/output circuit comprises a transceiver circuit which transmits the identifying information to a remote location that is remote from the reproducing apparatus and which receives the control information from the remote location.

21. The reproducing apparatus as claimed in claim 20, wherein the transceiver circuit transmits the identifying information to the remote location and receives the control information from the remote location via at least a wireless network.

22. The reproducing apparatus as claimed in claim 20, wherein the transceiver circuit transmits the identifying information to the remote location and receives the control information from the remote location via at least a wired network.

23. The reproducing apparatus as claimed in claim 14, wherein the input/output circuit comprises a memory read/write circuit which writes the identifying information to a removable memory and reads the control information from the removable memory.

24. The reproducing apparatus as claimed in claim 23, wherein the memory read/write circuit comprises a disk drive and wherein the removable memory comprises a disk.

25. The reproducing apparatus as claimed in claim 23, wherein the memory read/write circuit comprises a memory card reader and wherein the removable memory comprises a memory card.

26. The reproducing apparatus as claimed in claim 14, wherein the control information indicates a tone at which the plurality of audio information is to be reproduced.

27. The reproducing apparatus as claimed in claim 14, further comprising:

a display which displays a title of the plurality of audio information based on the control information.

* * * * *